United States Patent Office 2,833,793
Patented May 6, 1958

2,833,793

**17-OXYGENATED DERIVATIVES OF
5-ANDROSTENE-1,3-DIOL**

Raymond M. Dodson, Park Ridge, and Robert D. Muir, Deerfield, Ill., assignors to G. D. Searle & Co., Chicago, Ill., a corporation of Delaware No Drawing. Application September 30, 1957
Serial No. 686,877

9 Claims. (Cl. 260—397.4)

The present invention relates to valuable 1α- and 1β-hydroxy derivatives of 5-androstene. It is particularly concerned with 1,3-dihydroxy-5-androsten-17-one, with 5-androstene-1,3,17-triol, with 17 - alkyl - 5 - androstene-1,3,17-triol, and with esters of the foregoing compounds. The compounds of the present invention can be represented by the general structural formula

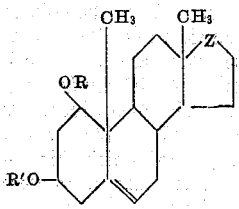

In this formula R and R' can represent hydrogen, the acyl radical of a lower alkanoic acid, or the acyl radical of a lower alkanesulfonic acid. Such acyl radicals can be selected from among lower alkanoyl radicals such as formyl, acetyl, propionyl, butyryl, valeryl, hexanoyl, heptanoyl, octanoyl, branched-chain isomers thereof, and cyclic analogs thereof; as well as from among lower alkanesulfonyl radicals having fewer than 9 carbon atoms, representively the acyl radicals of methanesulfonic, ethanesulfonic, propanesulfonic and homologous alkanesulfonic acids. In the foregoing structural formula the term Z can represent the carbonyl group (CO), the hydroxymethylene group (CHOH), groups of the formula

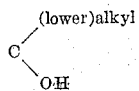

wherein the alkyl radical has fewer than 9 carbon atoms, and groups of the formula

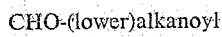

CHO-(lower)alkanoyl wherein the lower alkanoyl radical is defined as hereinbefore.

1α,3-dihydroxy-5-androsten-17-one (1α - hydroxydehydroisoandrosterone), a representative compound of this invention, can be obtained by subjecting dehydroisoandrosterone, under controlled conditions, to the oxygenating activity of a particular Penicillium organism isolated from a sample of Illinois soil.

A culture of this microorganism has been deposited with the American Type Culture Collection, Washington, D. C., and has been designated as Penicillium sp., accession No. 12,556. This organism is sometimes referred to hereinafter as ATCC 12,556.

In the manufacture of 1α,3-dihydroxy-5-androsten-17-one, the selected strain of organism is cultured on a medium favorable to its propagation. Synthetic or partially synthetic liquid media are generally preferred, as such liquid media afford certain advantages. Incorporation of available carbon, nitrogen, minerals and accessory nutrient factors is facilitated by the use of a liquid medium. Use of a liquid culture medium affords additional advantages in permitting efficient aeration, intimate contact of the steroid substrate with the oxygenating enzymes of the fungus and conveniences in the isolation of the final product. Such a culture medium can incorporate a carbohydrate, as a source of available carbon, and proteins, hydrolysis products of proteins, or inorganic nitrates or ammonium salts, as a source of available nitrogen. Additional nutrient factors can be supplied by the incorporation of corn steep liquor into the medium. Mineral constituents and other accessory growth factors recognized in the prior art as being necessary or desirable for the growth of fungi are usually naturally present in the culture media described hereinafter. When synthetic media are employed which are deficient in minerals and other accessory growth factors, such constituents are added as required.

The sterilized culture medium is inoculated with Penicillium sp., ATCC 12,556, and growth of the organism is allowed to proceed under aerobic conditions at a suitable temperature. Temperatures within the range of 20–30° C. have been found desirable for the propagation of Penicillium fungi although appreciable growth also takes place outside of these limits. Aeration of the liquid culture medium is conveniently accomplished by agitation such as is achieved by stirring or by use of a shaking platform, by blowing air through the culture medium, or by a combination of these means.

The exact time and manner of introducing the steroidal substrate to the oxygenating activity of the Penicillium organism or enzymes is a relatively non-critical factor and these operating details can be selected from within fairly wide limits. For example, the steroid can be added to the culture medium prior to sterilization, at the time of inoculation of the medium with the fungus, or after the fungus has been allowed to grow for a period of time, conveniently up to 48 hours. The steroid to be oxygenated can be added to the culture medium as a solid, a suspension, or a solution. A desirably fine state of dispersion of the steroid is achieved by adding it to the fermentation medium as a solution in a small amount of ethanol or acetone. Oxygenation of the steroid can be achieved by subjecting it to the action of the entire culture, or alternatively, with the use of procedures known to the prior art, by subjecting it to the action of the separated oxygenating enzymes, free of nutritional factors which are needed for the growth of the fungus.

Satisfactory yields of oxygenated product are obtained by allowing a contact time of, typically, 8 to 48 hours, although substantial conversion begins almost immediately after the addition of the steroid to the fermentation mixture. The minimum period of time required for a satisfactory degree of conversion of the steroid depends on various factors such as the stage of growth of the fungus at the time of the addition of the steroid, the temperature of fermentation, and the rate of aeration. In general, extensive growth of the fungus before the addition of the steroid substrate tends to lessen the contact time required for satisfactory oxygenation of the steroid. A period of fungal growth of 24 hours, followed by a steroid contact time of 24 hours, has been found to give generally good results when the fermentation is conducted substantially as described herein. At the conclusion of the fermentation period, the steroidal product, which can contain unreacted dehydroisoandrosterone as well as steroidal transformation products, is recovered by such means as extraction with methylene chloride, and is subjected to purification or to separation into individual components by such means as crystallization from organic solvents or fractionation on a silica gel chromatography column. Depending upon specific conditions, there can be isolated a variety of transformation products, including not only 1,3-dihydroxy-5-androsten-17-one, but also 1-hydroxy-4-androsten-3,17-dione. The latter compound is also obtained by the fermentation of 4-androstene-3,17-dione with Penicillium sp., ATCC 12,556.

The structure of 1α,3-dihydroxy-5-androsten-17-one is established by classical methods of structure determination. Included among such classical methods are the determination of the behavior of the compound under esterifying conditions, determination of its absorption spectra under various conditions, investigation of the products which result when the newly introduced oxygenated group is eliminated with the formation of an unsaturated linkage, and analysis of molecular rotatory differences.

By oxidizing hydroxylic compounds of this invention to the corresponding ketones, and subjecting such ketones to stereoselective reducing processes, the various stereochemical modifications of the 1,3,17-tri-oxygenated derivatives of this invention can be obtained. Illustrative of this procedure is the reaction sequence, described more fully in the examples to follow, which comprises the oxidation of 1α-hydroxy-3β-acetoxy-5-androsten-17-one to 3β-acetoxy-5-androstene-1,17-dione, reduction with lithium aluminum hydride to yield a reaction mixture from which 5-androstene-1β,3β,17β-triol is isolated, and catalytic hydrogenation to androstane-1β,3β,17β-triol. For the synthesis of 1β,3β-dihydroxy-5-androsten-17-one the 17-oxo group should be protected, e. g. by formation of the dioxolane derivative. Thus the dioxolane derivative of 1α-hydroxy-3-acetoxy-5-androsten-17-one is oxidized with chromium trioxide and pyridine and the resulting 1-oxo derivative is reduced with lithium aluminum hydride to yield a mixture from which the dioxolane derivative of 1β-hydroxy-3β-acetoxy-5-androsten-17-one is isolated. Hydrolysis of the 3-acetyl group and of the dioxolane group yields the 1β,3β-dihydroxy-5-androsten-17-one.

Upon reaction of 1,3β-dihydroxy-5-androsten-17-one with esterifying reagents, differential rates of esterification are observed, with the 3β-hydroxyl group being esterified at a substantially more rapid rate than the 1α- or 1β-hydroxyl group. By taking advantage of these differing reaction rates, there can conveniently be obtained either monoesters or diesters, including mixed diesters. For example, these differential rates of esterification can be demonstrated and measured by preparing reaction mixtures, each comprising one part of 1α,3β-dihydroxy-5-androsten-17-one, 40 parts of pyridine and 10 parts of acetic anhydride, terminating the acylation reactions after varying periods of time, and determining the percentages of starting material and various esters present. It is demonstrated in this manner that in reaction periods of less than 30 minutes the principal component of the mixture is unreacted starting material, that the 3-monoacetate is present in good yield after reaction times of from 1–4 hours, and that the 1,3-diacetate is present in good yield after reaction times of the order of 24–72 hours. Mixed esters are formed by treating a 3-monoester for an extended period of time with an acylating agent other than the one chosen for the initial esterification reaction.

By reduction of 1α,3β-dihydroxy-5-androsten-17-one with an alkali metal hydride such as sodium borohydride or lithium aluminum hydride, a trihydroxylated product, predominantly 5-androstene-1α,3β,17β-triol, is obtained. The hydroxyl groups of this compound can be esterified and differentially esterified in a manner analogous to that described hereinbefore.

Alkyl derivatives encompassed within this invention can be prepared by the reaction of a 17-ketone with an organometallic reagent. Thus, reaction of 1,3-dihydroxy-5-androsten-17-one with an alkylmagnesium halide, followed by hydrolysis of the primary reaction product, affords principally a 17-alkyl-5-androstene-1,3,17β-triol.

The compositions of the present invention have useful pharmaceutical applications, and specifically are androgenic and anabolic agents. A particular utility of compositions of this invention is that they are chemical intermediates of great value in the manufacture of androgenic and estrogenic hormones. For example, the oxidation of 1α,3β - dihydroxy - 5 - androsten - 17 - one in a medium comprising aluminum isopropoxide, toluene, and cyclohexanone affords 1,4 - androstadiene - 3,17 - dione. An analogous oxidation of 5 - androstene - 1α,3β,17β-triol affords 17β - hydroxy - 1,4 - androstadien - 3 - one (1 - dehydrotestosterone), in addition to some 1,4 - androstadiene - 3,17 - dione. These androstadienes, which possess androgenic properties, are useful in the manufacture of estrogenic hormones by known procedures of thermal aromatization. Such thermal aromatization procedures are commercially important in the manufacture of estrone and other estrogenic hormones, and have been described in considerable detail in such places as U. S. Patents 2,280,828; 2,361,847; 2,594,349; and 2,705,237. For example, by the application of such processes 1,4-androstadiene - 3,17 - dione can be converted to estrone, and 17β - hydroxy - 1,4 - androstadien - 3 - one can be converted to estradiol. By employing compositions of the present invention as intermediates, estrogenic hormones can be manufactured from compounds of the androstane series without the use of the inefficient and difficult bromination and debromination steps previously employed in commercial operations. In our U. S. patent issued September 3, 1957 (which was copending with the abandoned application of which this application is a continuation-in-part), there has been described the manufacture of 1α - hydroxy - 4 - androstene - 3,17 - dione and its direct conversion into estrone by pyrolysis. The present application and the above patent consequently describe alternative routes for the conversion of compounds of the androstane series into compounds of the estrane series. With respect to the fact that there are certain advantages to be associated with each alternative route, it is to be noted that 1α,3β - dihydroxy - 5 - androsten-17 - one is much more easily isolable from fermentation mixtures than is 1α - hydroxy - 4 - androstene - 3,17-dione, in consequence of the low solubility and ease of crystallization of the former compound. In addition, variations in the costs of starting materials can substantially affect the relative attractiveness of these synthetic routes.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.) and quantities of materials, except as otherwise noted, in parts by weight.

This application is a continuation-in-part with the copending application Serial No. 624,958, filed November 29, 1956, now abandoned.

EXAMPLE 1

A stainless steel fermentation tank having a capacity of about 40 liters is charged with a solution of 1000 grams of dextrose, 200 grams of a cottonseed protein concentrate, 90 milliliters of corn steep liquor and 12 milliliters of concentrated hydrochloric acid in 25 liters of tap water. Five grams of an anti-foaming agent, suitably of a silicone-type, is added and the contents of the vessel are sterilized by the introduction of live steam under pressure to a final temperature of about 110–115° C. and a final volume of about 30 liters. After cooling, an inoculation is made with a spore suspension of Penicilium sp., ATCC 12,556, and the contents of the fermentor are kept in agitation by a stirrer operating at about 200 revolutions per minute. A stream of air which has been sterilized by filtration through a glass wool filter is introduced through an inlet tube into the fermentor at a rate of about 10 liters per minute. This rate of aeration is measured by means of rotameter placed in the sterile portion of the air line. Growth of the organism is allowed to continue for 24 hours at about 25° C., during which time additional small quantities of anti-foaming agent are added if required. At this point about 20 liters of the culture is conducted by means of a sterile hose connection into a second stainless steel fermentation tank, which has a capacity of about 400 liters and which has previously been charged with about 255 liters of a sterilized and cooled aqueous solution of 1200 milliliters of corn steep liquor and 408 grams of monobasic potassium phosphate, $KH_2PO_4$. The contents of this fermentor are kept agitated by a stirrer operating at about 150 revolutions per minute and by the introduction of a stream of sterile air at a rate of about 30 liters per minute. Growth of the organism is allowed to proceed in this fermentor for an additional 24 hours, after which time there is added a solution of 75 grams of dehydroisoandrosterone in 1500 milliliters of acetone. Fermentation in the presence of the steroid substrate is continued for an additional 20 hours at 25° C., with the same rates of stirring and aeration. Diatomaceous earth is then added, and the mycelium is separated by centrifugation. The mycelium is stirred with 18 liters of methylene chloride, and the aqueous broth collected in the centrifugation of the mycelium is extracted with a total of 200 liters of methylene chloride in two equal portions. The combined methylene chloride solutions are concentrated by distillation under reduced pressure to a suspension having a small volume, and the suspension is then evaporated to dryness. The non-volatile residue is extracted with 200 milliliters of boiling ether. Following this operation, which serves to remove certain ether-soluble impurities, a solid or semi-solid product amounting to about 25 grams is collected on a filter. Upon crystallization of this crude product from a mixture of pyridine and ether and then from aqueous pyridine there is obtained purified 1α,3β - dihydroxy - 5 - androsten - 17 - one (1α - hydroxydehydroisoandrosterone) which melts at about 288–290° C. after prior softening and has a specific rotation of about +10.6° in chloroform solution. The structural formula is

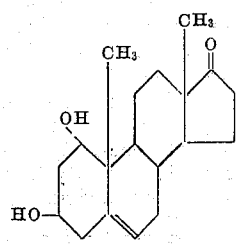

The combined crystallization liquors are concentrated to dryness, and a benzene solution of the nonvolatile residue is applied to a silica gel chromatography column containing a quantity of silica equal to 80 times the weight of the crystallization liquor residues. By elution of the column with mixtures of benzene and ethyl acetate containing gradually increasing proportions of ethyl acetate, there are obtained an additional quantity of 1α,3β - dihydroxy - 5 - androsten - 17 - one, and a quantity of 1α-hydroxy - 4 - androstene - 3,17 - dione, identical with the product of Example 11. The latter compound is obtained at a satisfactory rate by elution with a 30–40 volume percent solution of ethyl acetate in benzene, and the former compound is obtained at a satisfactory rate by elution with a 50–70 volume percent solution of ethyl acetate in benzene.

The isomeric 1β,3β - dihydroxy - 5 - androsten - 17-one melts at about 195–197° C.

EXAMPLE 2

A solution of 1 part of 1α,3β - hydroxy - 5 - androsten - 17 - one in 20 parts of warm pyridine is cooled to room temperature and treated with 10 parts of acetic anhydride. The reaction mixture is allowed to stand at about 25° C. for 1 hour and then filtered from a small quantity of insoluble residue. The filtrate is stirred with several times its volume of ice, until the ice melts and separation of the insoluble product is complete. This product is collected on a filter and purified by crystallizations from mixtures of acetone and ether or mixtures of acetone and cyclohexane. In this manner there is obtained 1α - hydroxy - 3β - acetoxy - 5 - androsten-17-one which melts at about 243–244° C. and has a specific rotation of about —6.7° in chloroform solution. This compound can also be purified by chromatography on a silica gel column, by elution with mixtures of benzene and ethyl acetate containing gradually increasing proportions of ethyl acetate. The desired compound is eluted at a satisfactory rate with a 20 volume percent solution of ethyl acetate in benzene. The structural formula is

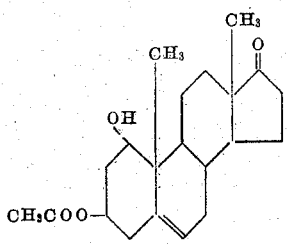

EXAMPLE 3

A solution of 1 part of 1α,3β - hydroxy - 5 - androsten - 17 - one in 20 parts of warm pyridine is cooled to room temperature and treated with 10 parts of acetic anhydride. The reaction mixture is allowed to stand at about 25° C. for 72 hours, after which it is stirred with several times its volume of ice until all of the ice has melted and precipitation of the insoluble product is complete. This product is collected on a filter and then crystallized a few times from methanol and from acetone. The purified compound, 1α,3β - diacetoxy - 5 - androsten-17-one, melts at about 226–227° C. and has a specific rotation of about +25° in chloroform solution. This compound can also be purified by fractionation of the crude product on a silica gel chromatography column by eluting the column with mixtures of benzene and ethyl acetate containing gradually increasing proportions of ethyl acetate. The desired compound is eluted from the column at a satisfactory rate with a 5 volume percent solution of ethyl acetate in benzene. The structural formula is

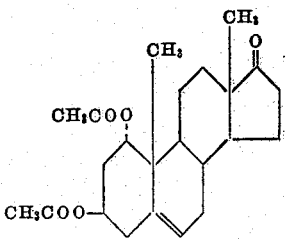

The isomeric 1β,3β - diacetoxy - 5 - androsten - 17-one melts at about 147–149° C.

EXAMPLE 4

A solution of 1 part of 1α,3β - dihydroxy - 5 - androsten-17-one in 20 parts of warm pyridine is cooled to room temperature and treated with 3 parts of methane-sulfonyl chloride. The reaction mixture is allowed to stand at about 25° C. for 24 hours and is then diluted with ice water until precipitation of the insoluble product is complete. This product, which is 1α,3β - dimethanesulfonoxy- 5-androsten-17-one, melts with decomposition to a purple melt at about 138–140° C. after crystallization from dilute acetone or from a mixture of acetone and cyclohexane. The structural formula is

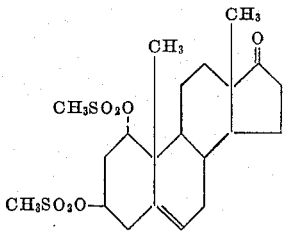

By the foregoing procedure, with the substitution of 3 parts of ethanesulfonyl chloride for the methanesulfonyl chloride, the product obtained is 1α,3β - diethanesulfonoxy - 5 - androsten - 17 - one.

EXAMPLE 5

A reaction mixture prepared from 1.75 parts of 1α-hydroxy - 3β - acetoxy - 5 - androsten - 17 - one, 10 parts of pyridine and 2.5 parts of methanesulfonyl chloride is allowed to stand at about 25° C. for 24 hours and is then stirred with ice water until separation of a crystalline product is complete. This product is collected on a filter and recrystallized from a mixture of acetone and cyclohexane or from dilute acetone to afford 1α-methanesulfonoxy - 3β - acetoxy - 5 - androsten - 17 - one which melts at about 152.5–153.5° C. and has the structural formula

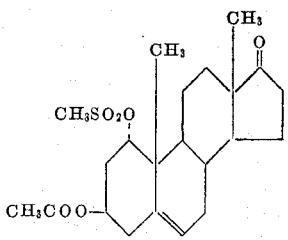

EXAMPLE 6

To a refluxing solution of 1.25 parts of 1α,3β-dihydroxy-5-androsten-17-one in 90 parts of tetrahydrofuran there is added a solution of 2 parts of lithium aluminum hydride in 45 parts of tetrahydrofuran over a period of about 15 minutes. The reaction mixture is heated under reflux for an additional 20 minutes, after which it is cooled and treated in succession with 30 parts of ethyl acetate, 12 parts of ethanol and 10 parts of water. The mixture is then diluted with ether, and washed with two portions of 10% sodium hydroxide solution and with water. The separated organic phase is dried over anhydrous sodium sulfate, filtered, and concentrated to dryness by vaporization of the solvents. The non-volatile residue is crystallized from a mixture of acetone and benzene to afford purified 5-androstene-1α,3β,17β-triol which, after thorough drying, melts at about 213–215° C. and has a specific rotation of about −54.8° in chloroform solution. The structural formula is

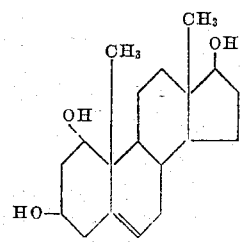

EXAMPLE 7

A reaction mixture prepared from 2 parts of 5-androstene-1α,3β,17β-triol, 50 parts of pyridine and 15 parts of propionic anhydride is maintained at about 25° C. for 72 hours, after which it is gradually diluted with 10 parts of water, with external cooling, until the unreacted propionic anhydride is hydrolyzed. Gradual dilution with water is then continued until separation of the insoluble reaction product is complete. This compound, which is 5-androstene-1α,3β,17β-triol tripropionate, is collected on a filter and washed with water. The infrared spectrum shows absorption peaks at about 5.77 and 8.05 microns, but no selective absorption in the region of 2.9 microns. The structural formula is

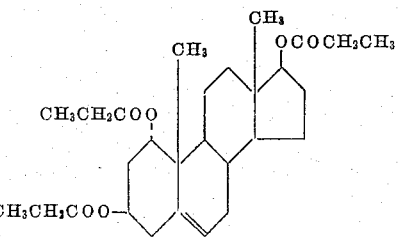

By the foregoing procedure, with the substitution of 15 parts of acetic anhydride for the propionic anhydride, the compound obtained is 5-androstene-1α,3β,17β-triol triacetate.

EXAMPLE 8

A solution of 1 part of 1α,3β-dihydroxy-5-androstene-17-one, 36 parts of toluene and 15 parts of cyclohexanone is rendered anhydrous by carrying out an azeotropic distillation until a distillate amounting to about 20 parts is removed. There is then added a solution of 2 parts of aluminum isopropoxide and 8 parts of anhydrous toluene, and the reaction mixture is heated under reflux for 30 minutes. It is then poured into 150 parts of a saturated solution of sodium potassium tartrate in water, and the mixture is distilled with steam until the organic solvents are substantially removed. The aqueous liquor is cooled and the solid or semi-solid product is collected and washed with water. This product can be purified by crystallization from mixtures of acetone and petroleum ether, or by chromatography on a silica gel column. To conduct the latter operation, a solution of the crude product in benzene is poured on a chromatography column prepared from 85 parts of silica, and the column is eluted with mixtures of benzene and ethyl acetate containing gradually increasing proportions of ethyl acetate. By elution with a 15 volume percent solution of ethyl acetate in benzene there is obtained the principal product of the reaction; this product melts at about 139–140° C. after recrystallization from a mixture of acetone and petroleum ether, and is identical with the known 1,4-androstadiene-3,17-dione.

Oxidation of 5-androstene-1α,3β,17β-triol by the same procedure affords 17β-hydroxy-1,4-androstadien-3-one along with some 1,4-androstadiene-3,17-dione.

EXAMPLE 9

To a refluxing suspension of 6.5 parts of 1α,3β-dihydroxy-5-androsten-17-one in 450 parts of tetrahydrofuran is added a 3 molar solution of methylmagnesium bromide in butyl ether containing a total of about 36 parts of methylmagnesium bromide. The addition is carried out over a period of about 10 minutes, after which refluxing is continued for an additional 2½ hours. Excess methylmagnesium bromide is decomposed by the addition of water to the cooled reaction mixture. The mixture is then chilled and partitioned between ether and an excess of saturated ammonium chloride solution. The separated ethereal phase is washed twice with saturated ammonium chloride solution and twice with water, after which it is rendered anhydrous, filtered, and concentrated by vaporization of the solvents under reduced pressure until there remains a residue comprising a solid product and a trace or small amount of butyl ether. Upon either chromatography on a silica gel column or fractional crystallization, this residue affords a quantity of unreacted 1α,3β-dihydroxy-5-androsten-17-one and a quantity of the desired product. Thus, a relatively small crystalline crop is obtained by crystallization from a mixture of acetone and butyl ether; this crystallizate melts at about 235–255° C. and is rich in unreacted starting material. Additional crystalline crops are obtained by concentrating the first crystallization liquor, and the crops which melt in the range of about 180–200° C. are subjected to further purification by recrystallization from a mixture of acetone and ether. In this manner there is obtained 17-methyl-5-androstene-1α,3β,17β-triol which melts at about 197.5–198° C. and has the structural formula

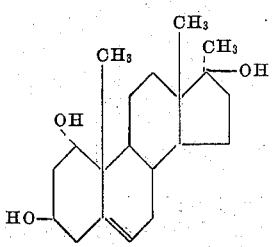

EXAMPLE 10

A 1 molar solution of ethylmagnesium bromide in butyl ether containing a total of 37 parts of ethylmagnesium bromide, maintained under reflux, is treated over a period of 20 minutes by the addition of a total of 5 parts of 1α,3β-dihydroxy-5-androsten-17-one in small portions. Refluxing is continued for an additional 5 hours, after which the unreacted ethylmagnesium bromide is decomposed by the cautious addition of water, and the entire resultant mixture, after chilling, is partitioned between ether and saturated ammonium chloride solution. The ethereal phase is washed with additional ammonium chloride solution and with several portions of water, after which it is rendered anhydrous, filtered and concentrated almost to dryness by vaporization of the solvents under reduced pressure. Upon fractional crystallizations of the residue from mixtures of acetone and ether, there is obtained 17-ethyl-5-androsten-1α,3β,17β-triol. The infrared absorption spectrum of this compound shows an absorption peak at about 2.9 microns but no selective absorption in the region of 5.8 microns.

EXAMPLE 11

A stainless steel fermentation tank having a capacity of about 40 liters is charged with a solution of 1000 grams of dextrose, 200 grams of a commercial enzymatic digest of lactalbumin, 90 milliliters of corn steep liquor and 15 milliliters of concentrated hydrochloric acid in 25 liters of tap water. Five grams of an anti-foaming agent, suitably of a silicone-type, is added and the contents of the vessel are sterilized by the introduction of live steam under pressure to a final temperature of about 110° C. and a final volume of about 30 liters. The contents of the fermentor are cooled and inoculated with a spore suspension of Penicillium sp., ATCC 12,556. The contents of the fermentor are kept agitated by a stirrer operating at about 200–300 revolutions per minute. A stream of air which has been sterilized by filtration through a glass wool filter is introduced through an inlet tube into the fermentor at a rate of from 15 to 22 liters of air per minute. This rate of aeration is measured by means of a rotameter placed in the sterile portion of the air line. Growth of the organism is allowed to continue for 24 hours at about 25° C., during which time the pH of the fermentation medium drops from about 4.5 to 3.6. During the 24 hour period of growth of the organism, additional small portions of anti-foaming agent are added as required. A solution of 10 grams of 4-androstene-3,17-dione in 750 milliliters of ethanol is added and fermentation in the presence of the steroid substrate is continued for an additional 24 hours at 25° C., with the same rates of stirring and aeration. The contents of the fermentor are stirred for 1 hour with 18 liters of methylene chloride. The mycelium is then separated by filtration and washed with about twice its volume of methylene chloride. The aqueous broth collected as a filtrate in the separation of the mycelium is stirred for an additional hour with a fresh portion of methylene chloride. The combined methylene chloride extracts, amounting to a total volume of about 40 liters, are concentrated under reduced pressure to a volume of about 750 milliliters. This concentrate is washed with water and evaporated to dryness under reduced pressure. The residue is extracted with 100 milliliters of methanol; decolorizing carbon is added and the solution is filtered from insoluble silicone. The filtrate is evaporated to dryness, and a solution of the residue in benzene is fractionated on a chromatography column prepared from 1000 grams of silica. The column is developed with 1 liter portions of solvents. Results of a representative fractionation are given in Table I and in the text which follows. It will be obvious to anyone possessing ordinary skill in chromatographic separations that the absolute positions of elution from the column are subject to variations in different runs, and that residues from successive eluates are combined for purification on the basis of evidence of substantial homogeneity, such as is afforded by a showing that successive residues have identical or similar melting points.

*Table I*

| Fractions | Solvent, Volume Percent Ethyl Acetate in Benzene | Eluate Solids, Milligrams |
| --- | --- | --- |
| 1-2 | 100% Benzene | 167 |
| 3-8 | 5 | 373 |
| 9-20 | 10 | 981 |
| 21-24 | 15 | 73 |
| 25-30 | 20 | 307 |
| 31-33 | 25 | 208 |
| 34 | 25 | 172 |
| 35-36 | 30 | 215 |
| 37-40 | 30 | 128 |
| 41-48 | 35 | 450 |
| 49 | 40 | 122 |
| 50-59 | 40 | 2,826 |
| 60-62 | 40 | 319 |
| 63-64 | 50 | 176 |
| 65-68 | 60 | 392 |

Crystalline residues from fractions 25 through 30, afford unconverted 4-androstene-3,17-dione upon purification. The crystalline residues from fractions 34 through 36, when crystallized from a mixture of acetone and cyclohexane, melt in the range of 132–140° C. Upon further purification by crystallization from aqueous acetone and again from a mixture of acetone and cyclohexane, they afford 2β-hydroxy-4-androstene-3,17-dione melting at about 143–145° C. This compound has a specific rotation of about −37° in chloroform solution, and an ultraviolet absorption maximum at 242 millimicrons with a molecular extinction coefficient of about 14,200.

Other crystalline products appear at various places in the elution sequence. The principal product of the fermentation appears in the crystalline residues of fractions 50 through 59. Crystalline residues from these eluates melt in the range of about 190–200° C.; they are combined and purified by crystallizations from mixtures of acetone and cyclohexane and from aqueous methanol. In this manner there is obtained 1α-hydroxy-4-androstene-3,17-dione melting at about 214.5–217° C. This compound exhibits a specific rotation of about +184° in chloroform solution, and has an ultraviolet absorption maximum at 240 millimicrons with a molecular extinction coefficient of about 15,000. It has the structural formula

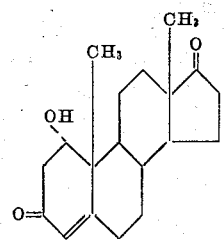

EXAMPLE 12

To a solution of 3.35 parts of chromium trioxide in 20 parts of pyridine is added a solution of 3.2 parts of 1α-hydroxy-3β-acetoxy-5-androsten-17-one in 30 parts of pyridine. The reaction mixture is stirred at about 35° C. for 4 hours, after which it is poured into several times its volume of ether and washed repeatedly with small portions of water. The ethereal solution is rendered anhydrous, filtered, and concentrated to a small volume by distillation under reduced pressure. Upon dilution with petroleum ether, crystallization is induced. When separation of the crystalline product is complete, it is collected on a filter and washed with petroleum ether. Traces of pyridine are removed by drying under high vacuum or by further crystallizations from mixtures of ether and petroleum ether. This compound is 3β-acetoxy-5-androstene-1,17-dione melting at about 156.5–159° C. The structural formula is

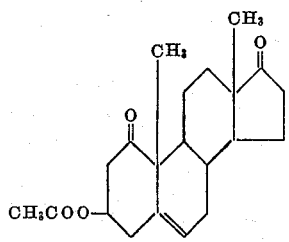

EXAMPLE 13

Over a period of about 30 minutes a solution of 4 parts of 3β-acetoxy-5-androstene-1,17-dione in 570 parts of anhydrous ether is added to a solution of 7 parts of lithium aluminum hydride in 1100 parts of refluxing anhydrous ether. Heating under reflux is continued for an additional 2 hours, after which acetone and water are added to decompose the unreacted lithium aluminum hydride. The reaction mixture is diluted with an equal volume of ether and washed twice with saturated ammonium chloride solution and twice with water. The ethereal solution is made anhydrous and brought to dryness by distillation. The residue consists of a mixture of a 1β-hydroxy compound with the 1α-hydroxy epimer.

To obtain a more highly purified 1β-hydroxy compound, the residue is crystallized from mixtures of methanol and benzene and then from mixtures of methanol and chloroform. This compound, 5-androstene-1β,3β,17β-triol, exhibits a variable melting point depending upon the rate of heating. On a melting point block preheated to about 270° C., it melts with slight decomposition at about 274–278° C.; whereas it melts over a broader and lower range when it is heated from room temperature. The specific rotation is about —39.8° in chloroform solution. The structural formula is

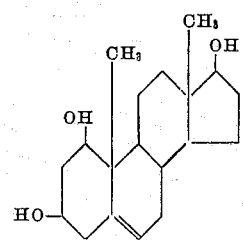

What is claimed is:
1. A compound of the structural formula

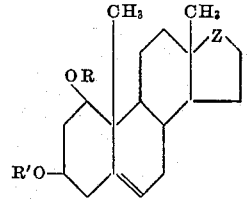

wherein R and R' are members of the class consisting of hydrogen and the acyl radicals of lower alkanoic and lower alkanesulfonic acids; and Z is a member of the class consisting of the carbonyl group, the hydroxymethylene group, groups of the formula

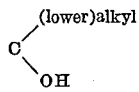

and groups of the formula

CHO-(lower)alkanoyl 2. 1α,3β-dihydroxy-5-androsten-17-one.
3. 1α - hydroxy-3β-(lower)alkanoyloxy-5-androsten-17-one.
4. 1α-hydroxy-3β-acetoxy-5-androsten-17-one.
5. 1α,3β-di-(lower)alkanoyloxy-5-androsten-17-one.
6. 1α,3β-diacetoxy-5-androsten-17-one.
7. 5-androstene-1α,3β,17β-triol.
8. 17-(lower)alkyl-5-androstene-1α,3β,17β-triol.
9. 17-methyl-5-androstene-1α,3β,17β-triol.

No references cited.

UNITED STATES PATENT OFFICE
Certificate of Correction

May 6, 1958

Patent No. 2,833,793

Raymond M. Dodson et al.

It is hereby certified that error appears in the printed specification of the above numbered patent requiring correction and that the said Letters Patent should read as corrected below.

Column 6, line 35, for "-hydroxy-" read — -dihydroxy- —; column 12, line 49, for "1a" read —1α—.

Signed and sealed this 12th day of August 1958.

[SEAL]

Attest:
KARL H. AXLINE,
*Attesting Officer.*

ROBERT C. WATSON,
*Commissioner of Patents.*